3,167,521
PROCESS OF GELLING FOAMED PLASTICIZED POLYVINYL CHLORIDE BY GRADUALLY HEATING WITH A HIGH FREQUENCY ELECTRIC FIELD
Joseph Heckmaier and Karl-Heinz Michl, Burghausen, Upper Bavaria, Germany, assignors to Wacker-Chemie G.m.b.H., Munich, Germany, a firm of Germany
No Drawing. Filed July 2, 1962, Ser. No. 207,051
Claims priority, application Germany, July 6, 1961, W 30,310
4 Claims. (Cl. 260—2.5)

Plasticized polyvinyl chloride can be converted into foamed structures by chemical means involving the use of a blowing agent or by the use of certain physical means. The physical means employed for the conversion into a foamed structure may either involve the removal of a gas which has been dissolved in the material under pressures or may involve the vaporization of a low-boiling agent which has been incorporated into the plasticized mass. The expansion of the foamed structure being formed can therefore be carried out either before or during the setting-up or hardening of the thermoplastic polyvinyl chloride structure. At ordinary pressures the expansion of the foam must be effected before any hardening takes place since the rigidity of the mass quickly reaches the point where any further increase in volume is quite impossible.

The application of a vacuum during the expansion or blowing operation, in contrast to the procedure carried out at ordinary pressures, produces spongy masses of low density. In this case the expansion must be carried out before the material hardens which requires that the mass be heated above its solidification temperature while under the vacuum applied. Because of the generally poor heat conductivity of the foam structures produced by this vacuum process the solidification takes place rather slowly and unevenly and for this reason only foam structures of limited thickness can be obtained. The uneven heating is also responsible for the fact that the pore structure throughout the spongy mass is quite variable. Consequently, an extended solidification period is required and during this time the foam structure can and does collapse, to some extent, because the enclosed gas has an opportunity to diffuse and cause certain of the gas cells to burst.

It is, therefore, an important object of this inveniton to provide a process for the production of foamed polyvinyl chloride structures in which heating of the material is effected rapidly and evenly and a structure of substantially uniform pore size is obtained.

Other objects of this invention will appear from the following detailed description.

It has now been found that foamed polyvinyl chloride structures having extremely homogeneous pore size may be obtained from plasticized polyvinyl chloride masses which contain only the usual plasticizing agents, stabilizers, fillers, etc., if a vacuum or suitable low pressure is maintained on the plasticized mass and the expanded mass is simultaneously or subsequently heated by the application of a high-frequency field to effect the desired gelation and solidification.

Depending upon the subatmospheric pressure reached, the process of the present invention yields spongy structures having a density of as low as 0.05 gm./cc. The air absorbed in the plasticized polyvinyl chloride particles during the usual processing operations is sufficient to cause a very substantial increase in volume when the masses are placed in a vacuum, and no blowing agents or low-boiling liquids are necessary to produce the desired expansion effect. The use of filling agents adds greatly to the capacity of the mass to absorb air and to undergo a correspondingly greater increase in volume when placed under a vacuum because of the porosity of the filling agents. If desired, the air which is absorbed in the polyvinylchloride particles or in the filling agent may be replaced by carbon dioxide or nitrogen before the mixture is plasticized if an inert gas is desired when forming the foam structure. With certain kinds of polyvinyl chloride the addition of emulsifying agents of the ionic and non-ionic type is advantageous.

The length of the heating period during which the gelation is effected depends, of course, upon both the size of the mold employed and upon the capacity of the high-frequency generator which is available.

The process of the present invention can be carried out conveniently by employing a cylindrical mold in the form of a hassock, for example, in which the cover plate and the base plate are connected to a high-frequency alternating current generator and the side wall is made of an insulating material. The process can be carried out batchwise in molds of the type described whose base and cover plates constitute high-frequency electrodes. The electric insulating material of which the side wall or walls are made may be such as to cause suitable dielectric losses in order to counteract heat losses. The molds can be formed so as to be vacuum-tight and evacuated directly, or if they are not presure-tight they may be placed in an outer container which is evacuated. The plasticized polyvinyl chloride mass undergoes expansion when the mold is evacuated and the expanded mass is then heated in the high-frequency field. Heating of the expanded mass to gelation causes a lowering of the viscosity of the mass which permits some of the gas-filled cells to rupture. Accordingly, it is preferable that the plastic mass be heated somewhat before application of the vacuum so that this effect will be avoided. It is also quite advantageous to heat the wall of the mold employed so that heat losses are at a minimum. The walls of the mold can also be heated by the use of a high frequency field taking advantage of their capacitance if they are formed of a material having suitable dielectric properties or the walls are covered with such a material. One such suitable material for forming the walls of the mold is a polyester resin such as that obtained by reacting maleic acid or itaconic acid with allyl alcohol or glycol. Another suitable material for the same purpose are the well-known epoxy resins. Polyvinyl alcohol, natural rubber or silicon rubber may be employed satisfactorily as the coating material.

After gelation or solidification has been completed the mold may be vented and the foam which has been formed may be cooled at ordinary pressure. It is quite surprising, however, that the foam obtained does not contain any cells which are sealed off and which contain low pressure gases. During the gelation it appears that the sealed off bubbles open sufficiently to permit communication so that the higher external pressure penetrates each of the cells and therefore prevents any collapse of the foam when solidification is complete. The foamed structures may also be formed in a continuous manner by forming a continuous strip of the plasticized polyvinyl chloride and feeding it to a vessel which is evacuated. The foamed strip is then subjected to gelation by being placed between two high-frequency electrodes one of which may be a metal belt, for example. The continuously foamed strip may then be removed from the low pressure vessel through a pressure lock.

The speed of gelation of the plasticized polyvinyl chloride material foamed under vacuum in the manner described is dependent upon the strength of the high frequency field which is applied as measured in kilovolts per sq. cm. The field strength which may be applied is limited by the fact that at a certain field strength arcing over will take place and this is related to the degree of vacuum in the vessel. If arcing takes place between the electrodes the foamed structure being formed will collapse.

In forming foamed masses of substantial thickness the voltage drop maintained between the electrodes must be greatly increased so that the field strength achieved will be sufficiently high to effect the desired gelation of the plastic foam. Under these conditions the danger of glow discharge on the surfaces of the electrodes increases markedly and this condition may lead to sparking and the collapse of the foamed polyvinyl chloride structure. The glow discharge may be minimized somewhat if the electrical field is as uniform as possible across the surfaces of the electrodes and such uniformity is greatly aided by the application of such organic non-conductors as polytetrafluoroethylene, polyethylene, rubber, silicone rubber or polyvinyl alcohol as a coating on the electrodes.

The process of the present invention is widely applicable, and the ratio of plasticizer to polyvinyl chloride which is employed may be varied within wide limits. Preferably from 0.5 to 1.0 part by weight of plasticizer is employed for each part by weight of polyvinyl chloride so that a satisfactory viscosity is achieved to permit the desired expansion. Foams comprising a polyvinyl chloride-resin combination may also be formed. As the plasticizer or softening agent employed one may use a polymerizable compound alone or in combination with the usual plasticizing agents and in this modification of the present process the desired polymerization may be effected during the formation of the foam and the subsequent gelation of the expanded polyvinyl chloride base material. Thus, for example, it has been found that tetraethyleneglycoldimethacrylate employed in combination with a peroxide or with a redox-system can readily be polymerized during the gelation of the foamed polyvinyl chloride to yield a combination resin-polyvinyl chloride foam structure. Foams which are composed of such combinations cannot be obtained by the use of the usual blowing agents, such as aziosobutyronitrile, because the usual decomposition products of these blowing agents cause a premature polymerization of the monomeric softening agent and the mixture hardens so rapidly that only a very slight degree of expansion can take place.

In accordance with the process of this invention the foamed materials which are obtained have a preponderance of open pores communicating with each other and are ideally suited for use as upholstery materials. The resin-polyvinyl chloride structures obtained are excellent insulating materials.

An important feature of the present invention resides in the fact that it has now been found that the field strength at which arcing will take place in the novel process described is strongly dependent upon the degree of gelation of the polyvinyl chloride material. Thus, while cold foamed polyvinyl chloride materials are quite sensitive to arcing over of the field it has been found that this tendency decreases markedly when these foams are heated. Accordingly, it has been found that substantially improved results can be obtained if the foamed mass is first heated at relatively low field strength and as the temperature of the material increases the field strength is gradually increased. This novel mode of operation has been found to decrease greatly the danger of arcing and since the field strength may be greatly increased as gelation proceeds the total time for gelation which is required is substantially decreased.

In order further to illustrate this invention the following examples are given:

Example 1

Into a vessel provided with a planetary-type mixer are charged 100 parts by weight of a plasticizable polyvinyl chloride having a K-value of 75 and 70 parts by weight of dibutylphthalate and the whole thoroughly mixed after the addition of 0.2 part by weight of monophenylurea as a stabilizing agent. The plastisol formed is then homogenized on a roller mill and introduced into the mold in which evacuation and heating takes place. The amount of plastisol placed in the mold is one-fifteenth its volume. The mold is sealed and then evacuated down to a pressure equal to 8 mm. Hg which causes the plastisol to expand and to form a homogeneous foam of fine, cellular structure which completely fills the mold. After being exposed to the action of a high-frequency alternating current field for about two minutes, during which time the temperature reaches about 180° C., the foam takes on a solid-elastic form and is then cooled at atmospheric pressure in a current of air. The solid-elastic foam obtained has a density of 0.08 gm./cc.

Example 2

A mixture of 100 parts by weight of polyvinyl chloride as described above, 30 parts of dibutylphathalate, 50 parts of tetraethyleneglycoldimethacrylate and 1.5 parts by weights of lauroyl peroxide is throughly mixed and homogenized as described in Example 1 and the plastisol then formed into a foam structure in the same mold and under the same high-frequency generated temperature conditions. The foam obtained has a density of 0.09 gm./cc.

Example 3

6.5 kilograms of the polyvinyl chloride material prepared as described in Example 1 above is introduced into a mold having a capacity of 65 liters and in which the electrodes for application of the high-frequency field are held apart a distance of 30.5 cm. The mold is then evacuated as described above in Example 1 and the polyvinyl chloride material is converted into a foamed structure which expands until the mold is filled. Gelation is then effected by the application of a high-frequency field across the electrodes over a total elapsed time of fifteen minutes, the voltage drop between the electrods and the field strength being gradually increased as indicated in the following sequence:

| Heating Time in Minutes | Voltage Drop Between Electrodes (kv.) | Field Strength, kv./cm. |
| --- | --- | --- |
| 1 | 7.5 | 0.246 |
| 1 | 8 | 0.262 |
| 1.5 | 8.5 | 0.279 |
| 1.5 | 9.5 | 0.311 |
| 1.5 | 10.5 | 0.344 |
| 1.5 | 11.5 | 0.377 |
| 1.5 | 12.5 | 0.410 |
| 5.5 | 13.5 | 0.442 |
| 15.0 | | |

When the vacuum is broken and the polyvinyl chloride foam is removed the foam is found to have an extremely uniform cell structure and a density of 0.1 gram per cubic centimeter.

The density of the foam structures formed in accordance with the present invention can be varied widely depending upon the amount of the plasticized polyvinyl chloride mixture charged to the mold and can ordinarily be varied from 0.05 to 0.25 kg./liter. The cellular volume throughout these structures is quite uniform.

This application is a continuation-in-part of our copending application Serial No. 838,032, filed September 4, 1959, now United States Patent No. 3,055,848.

We claim:

1. Process for the production of polyvinyl chloride foamed structures, which comprises introducing into a confined space of the desired shape a polyvinyl chloride plastisol containing only the gas absorbed therein under atmospheric pressure while forming the plastisol, reducing the pressure in said confined space to subatmospheric pressure whereby the contained gas absorbed in said plastisol expands and converts the plastisol into a foamed structure conforming to the shape of the confined space, and then causing the foamed structure to undergo gelation by heating the latter with an applied high-frequency electric field with the voltage drop across said high-frequency field being gradually increased as said gelation proceeds but maintained below arcing voltage.

2. Process in accordance with claim 1 wherein the polyvinyl chloride plastisol contains a polymerizable monomer which undergoes polymerization during the heating of the expanded structure.

3. Process in accordance with claim 1 wherein the foamed structure obtained is subjected to subsequent cooling while at ordinary pressure.

4. Process for the production of modified polyvinyl chloride foamed structures, which comprises introducing into a confined space of the desired shape a mixture of a polyvinyl chloride plastisol with monomeric tetraethyleneglycoldimethacrylate and a peroxide polymerization catalyst, said mixture containing only the gas absorbed therein under atmospheric pressure while forming the plastisol and monomer mixture, reducing the pressure in said confined space to subatmospheric pressure whereby the contained gas absorbed in said plastisol expands and converts the plastisol mixture into a foamed structure conforming to the shape of the confined space, and then causing the foamed structure to undergo gelation and the monomer therein to undergo polymerization by heating said foamed structure with an applied high-frequency field with the voltage drop across said high-frequency field being gradually increased as said gelation proceeds but maintained below arcing voltage.

References Cited by the Examiner
UNITED STATES PATENTS

| | | | |
|---|---|---|---|
| 2,966,469 | 12/60 | Smythe et al. | 260—2.5 |
| 3,055,848 | 9/62 | Heckmaier et al. | 260—2.5 |

MURRAY TILLMAN, *Primary Examiner.*

LEON J. BERCOVITZ, *Examiner.*